US012129712B1

(12) United States Patent
Wong

(10) Patent No.: US 12,129,712 B1
(45) Date of Patent: Oct. 29, 2024

(54) MAGNETIC GARAGE SCREEN (NET) ASSEMBLY

(71) Applicant: Choon Hsien Wong, Round Rock, TX (US)

(72) Inventor: Choon Hsien Wong, Round Rock, TX (US)

( * ) Notice: Subject to any disclaimer, the term of this patent is extended or adjusted under 35 U.S.C. 154(b) by 320 days.

(21) Appl. No.: 17/705,123

(22) Filed: Mar. 25, 2022

(51) Int. Cl.
*E06B 9/52* (2006.01)

(52) U.S. Cl.
CPC ........ *E06B 9/521* (2013.01); *E06B 2009/527* (2013.01)

(58) Field of Classification Search
CPC ...... E06B 9/52; E06B 9/521; E06B 2009/527; E06B 9/78; E06B 2009/785; A47H 2201/01
See application file for complete search history.

(56) References Cited

U.S. PATENT DOCUMENTS 786,087 A * 3/1905 Benedict ................... E06B 9/78 160/293.1
3,004,592 A * 10/1961 Norton ...................... E06B 9/52 160/90
4,874,028 A * 10/1989 Lynch .................... A47H 99/00 160/332
6,035,919 A * 3/2000 Zinbarg ................ E06B 3/7001 160/113
6,257,307 B1 * 7/2001 Tollivar .................... E06B 9/52 160/354
6,557,614 B1 * 5/2003 Lampers ................... E06B 7/02 160/113
6,915,833 B2 * 7/2005 Hoffman ................... E06B 9/52 160/89
7,320,353 B1 * 1/2008 Miller ....................... E06B 3/80 160/368.1
2002/0062930 A1 * 5/2002 Jennings ................. E06B 9/521 160/370.22
2021/0355754 A1 * 11/2021 Conboy ................. A47H 23/05
2022/0225813 A1 * 7/2022 Garfinkel ............... A47H 23/01
2023/0250691 A1 * 8/2023 Riddle .................... E06B 9/521 160/349.1

FOREIGN PATENT DOCUMENTS

CN 109577783 B * 5/2020 ............. E05F 15/60
KR 20110006558 A * 1/2011

* cited by examiner

*Primary Examiner* — Abe Massad
(74) *Attorney, Agent, or Firm* — Plager Schack LLP; Mark H. Plager, Esq.; Michael J. O'Brien, Esq.

(57) ABSTRACT

A screen net assembly is configured to keep our flying insects. The screen net attached to garage door that travels along a first garage door rail and a second garage door rail. A first magnetic garage door unit arranged in the garage and further having a screen. A first long door magnet and a second long door magnet joined to the screen with a seam as walkway therebetween. A plurality of handle bars are joined to the screen and configured to assist a user with raising and lowering the first magnetic garage door unit along the garage door. A plurality of locking bars, joined to the screen and configured to lock the screen to an edge of the garage door. A walkway, arranged between the first long door magnet and the second long door magnet. A user can walk through the walkway while keeping flying insects out of the garage.

4 Claims, 6 Drawing Sheets

MAGNETIC GARAGE SCREEN (NET) ASSEMBLY

BACKGROUND

The embodiments herein relate generally to construction and civil engineering.

Prior to embodiments of the disclosed invention, there was no effective way to keep flying insects out of a garage that allow homeowner to enjoy activities in garage with garage door open with easy installation and tool-less setup.

SUMMARY

A screen net assembly is configured to keep flying insects out of a garage. The screen net attached to garage door that travels along a first garage door rail and a second garage door rail. A first magnetic garage door unit arranged in the garage and further having a screen. A first long door magnet and a second long door magnet joined to the screen with a seam as walkway therebetween. A plurality of handle bars is joined to the screen and configured to assist a user with raising and lowering the first magnetic garage door unit along the garage door. A plurality of locking bars, joined to the screen and configured to lock the screen to an edge of the garage door. A walkway, arranged between the first long door magnet and the second long door magnet. A user can walk through the walkway while keeping flying insects out of the garage.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
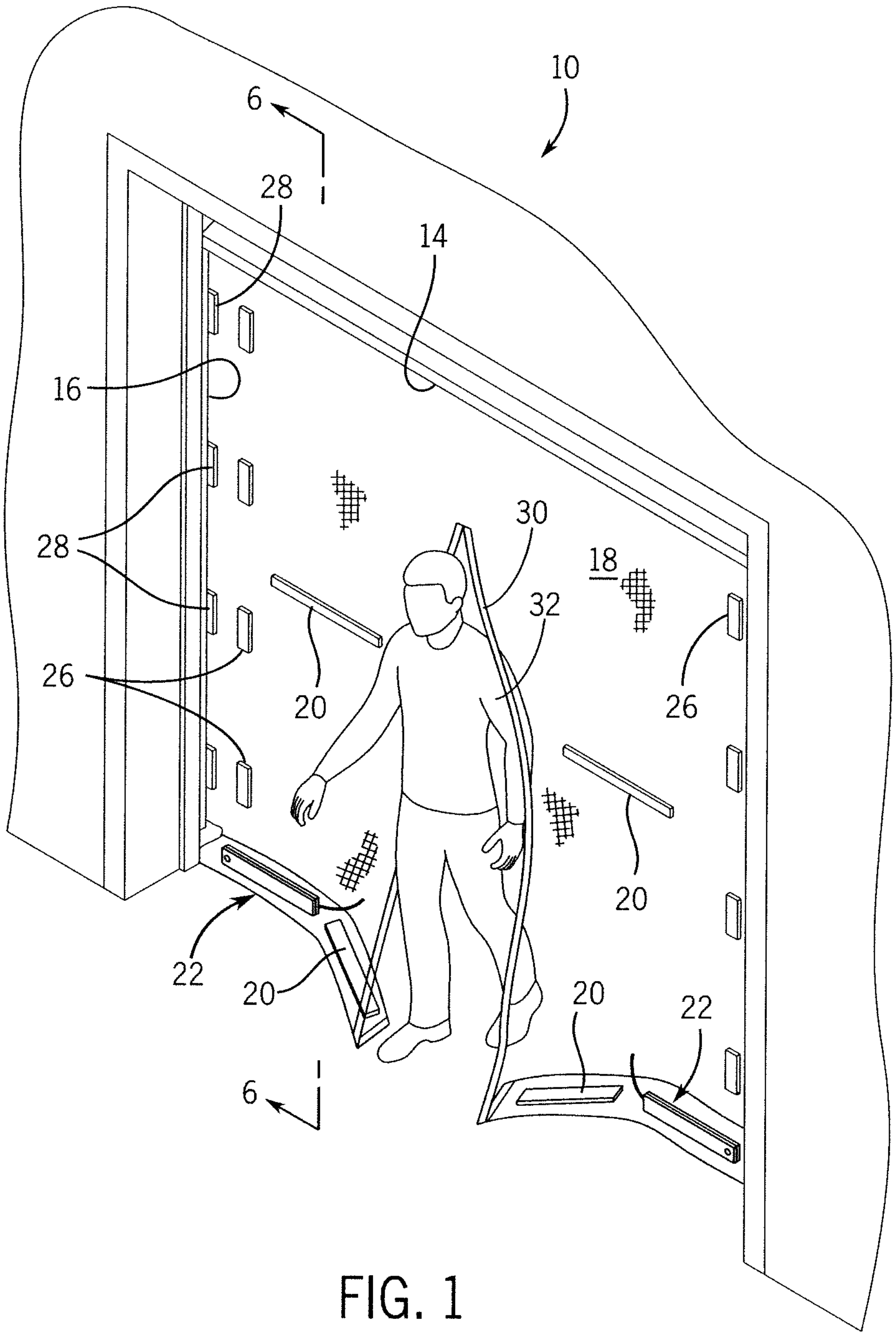
FIG. 1 shows a perspective view of one embodiment of the present invention when in use at single car garage.
Figure 2:
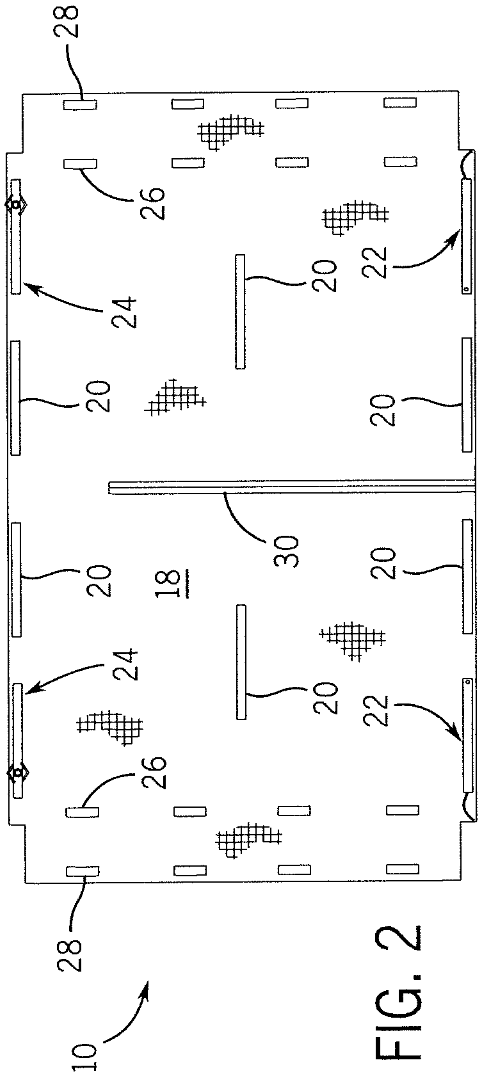
FIG. 2 shows a front elevation view of one embodiment of the present invention.
Figure 3:
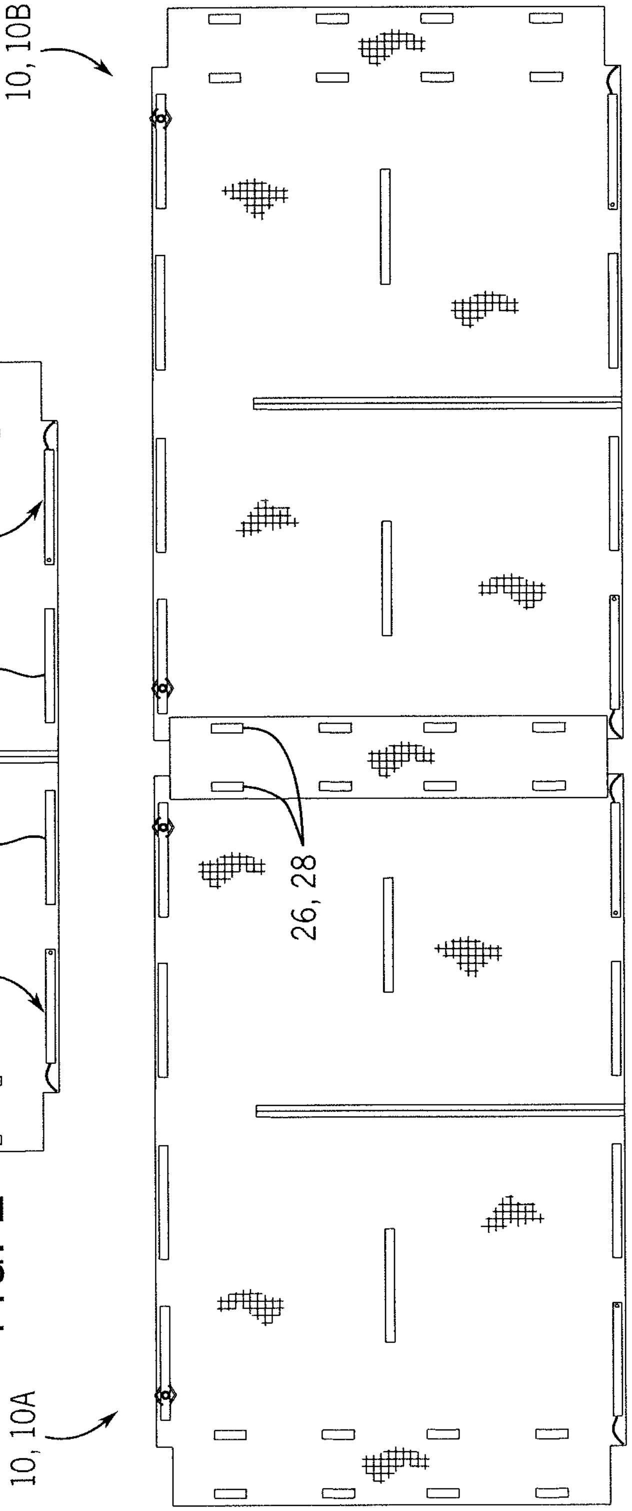
FIG. 3 shows a front elevation view of one embodiment of the present invention when two garage screen nets side by side joined together by magnetic.
Figure 4:
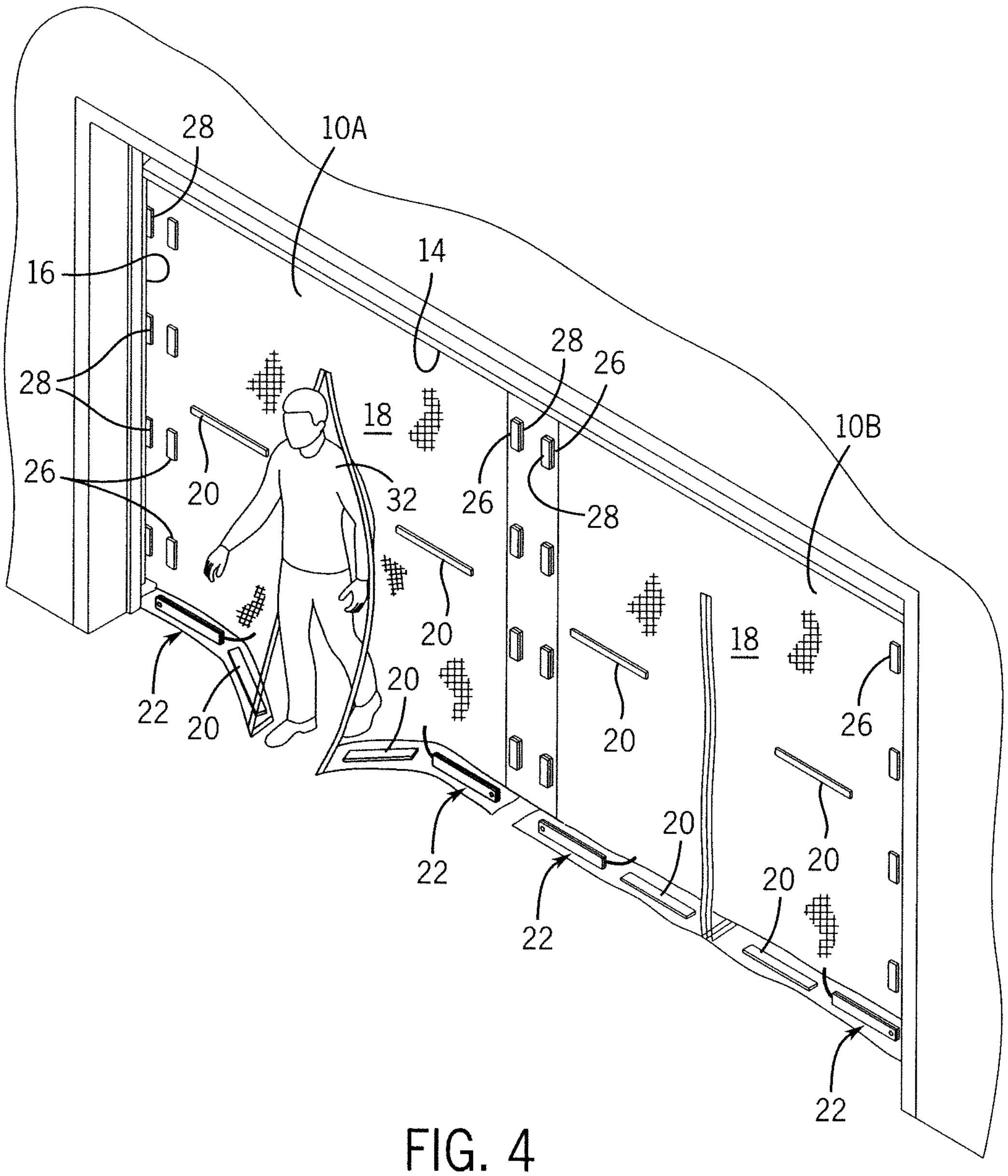
FIG. 4 shows a perspective view of one embodiment of the present invention when in use at two-car garage.
Figure 5:
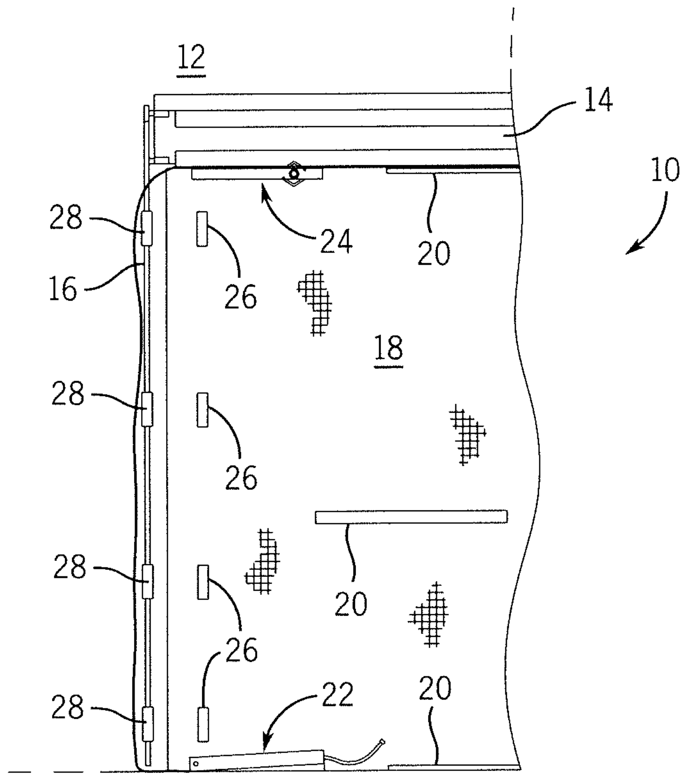
FIG. 5 shows a partial interior elevation view of one embodiment of the present invention.
Figure 6:
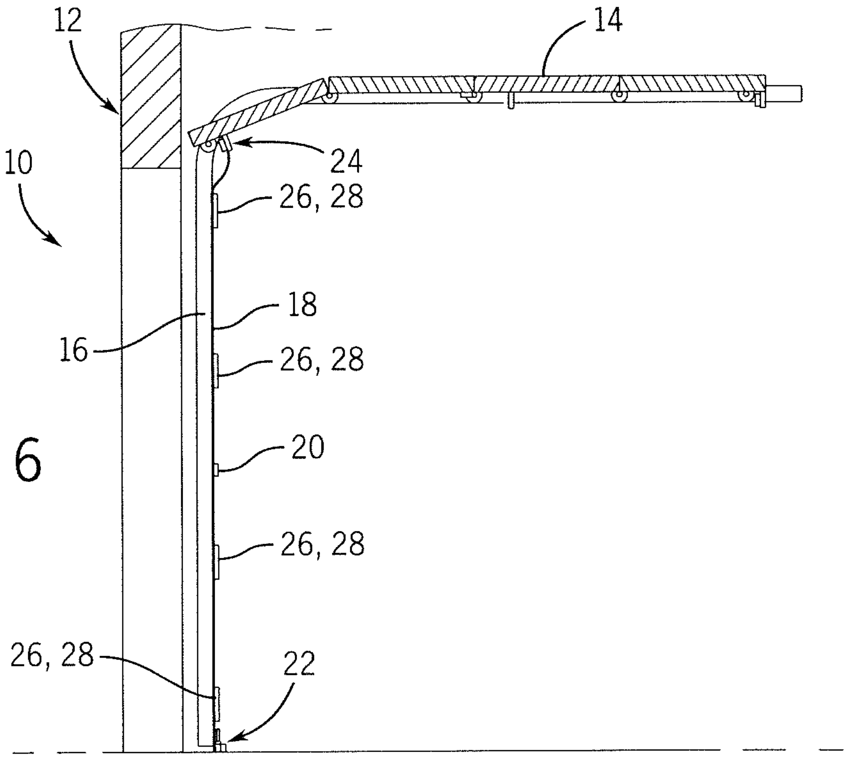
FIG. 6 shows a detail section view of one embodiment of the present invention taken along line 6-6 in FIG. 1.
Figure 7:
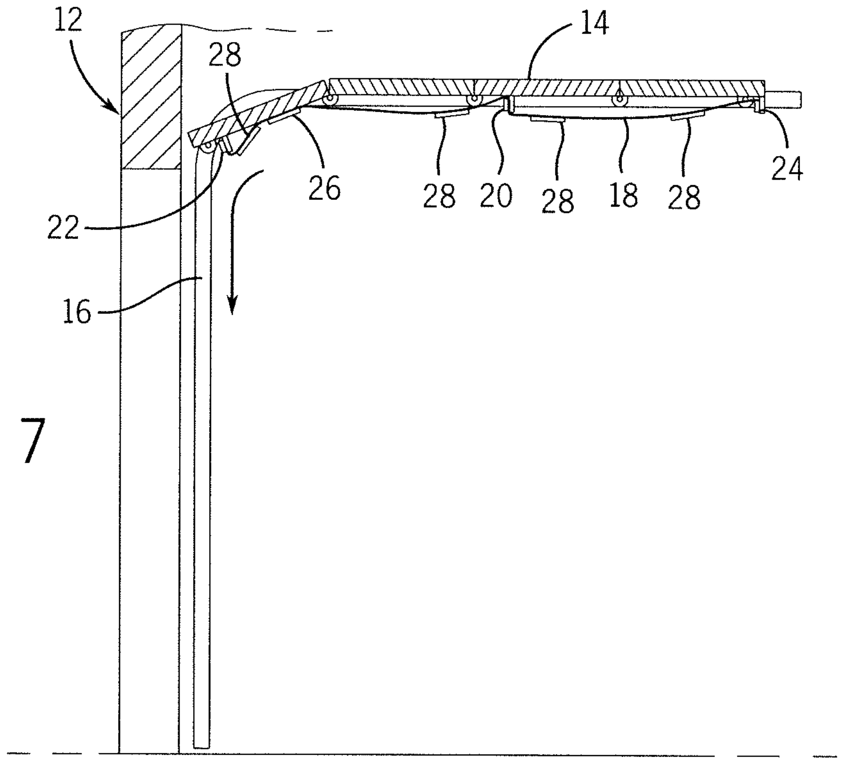
FIG. 7 show one embodiment of the invention in a stowed position on an open garage door.
Figure 8:
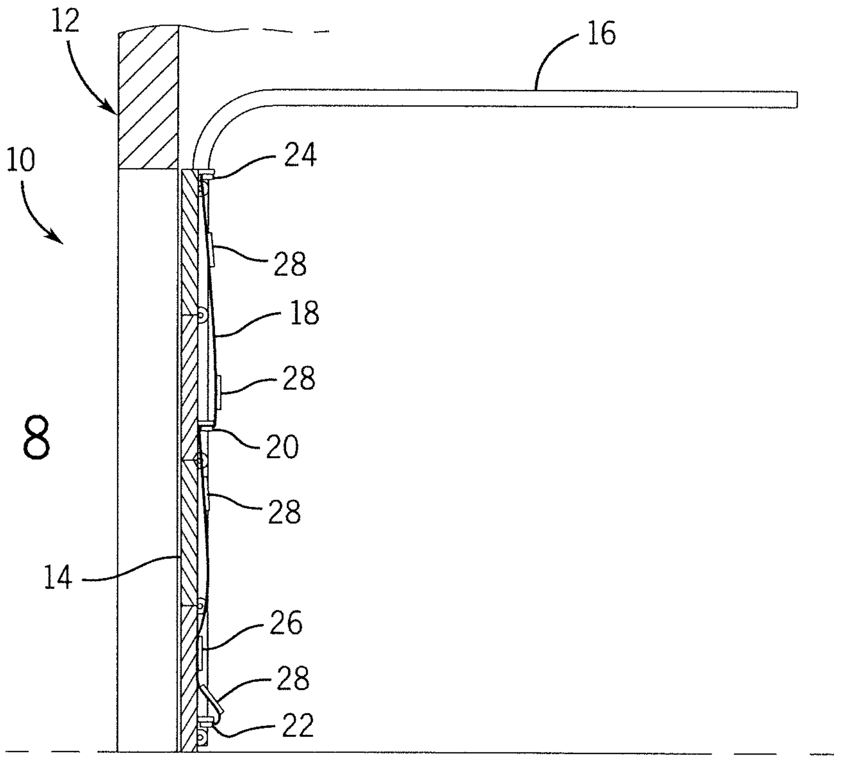
FIG. 8 show one embodiment of the invention in a stowed position on a closed garage door.
Figure 9:
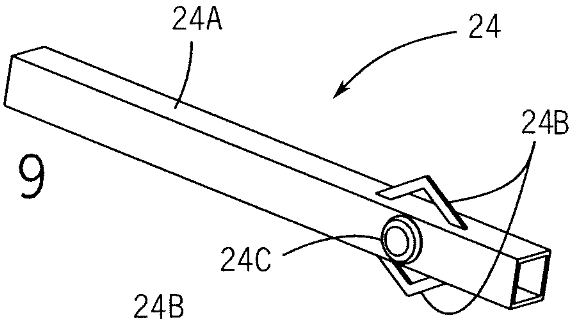
FIG. 9 shows a detail view of one embodiment of the locking bar of the present invention.
Figure 10:
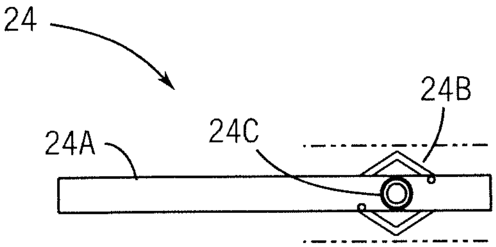
FIG. 10 shows a detail view of one embodiment of the locking bar of the present invention in side view.
Figure 11:
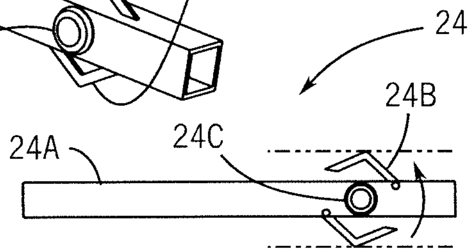
FIG. 11 shows a detail view of one embodiment of the locking bar of the present invention in an open and locked position.
Figure 12:
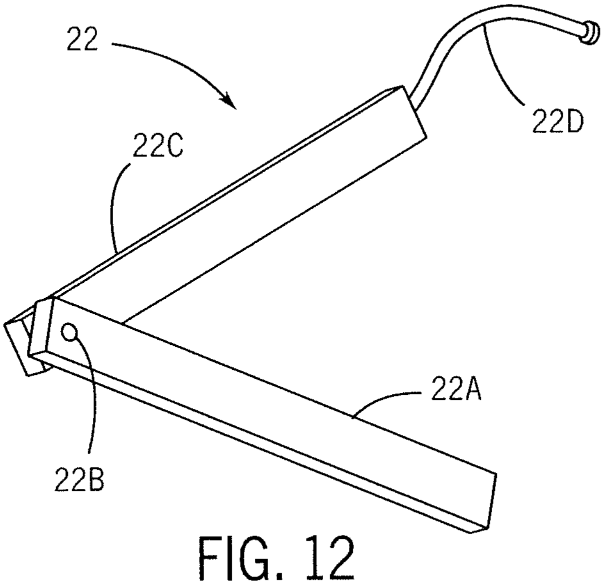
FIG. 12 shows a detail view of one embodiment of the handle bar of the present invention.
Figure 14:
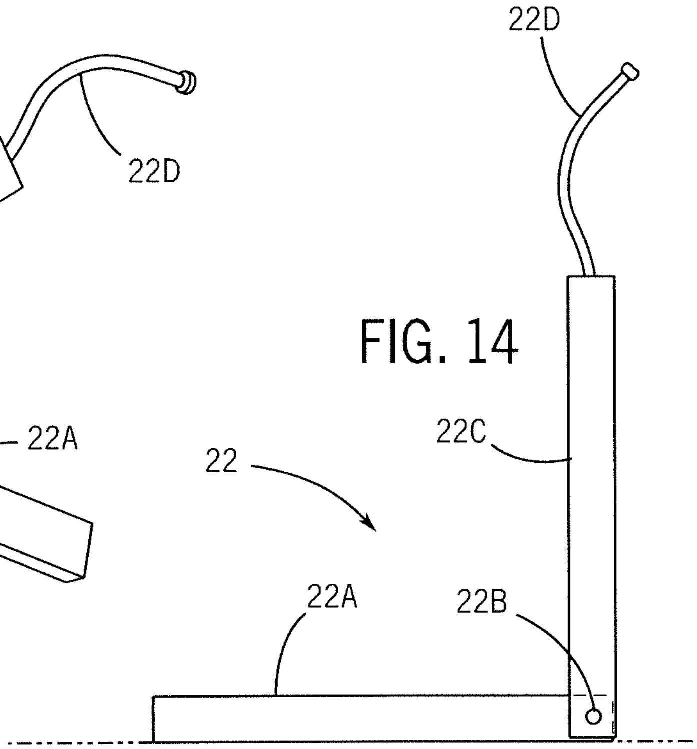
FIG. 14 shows a detail view of one embodiment of the handle bar of the present invention in an in-use position.
Figure 13:
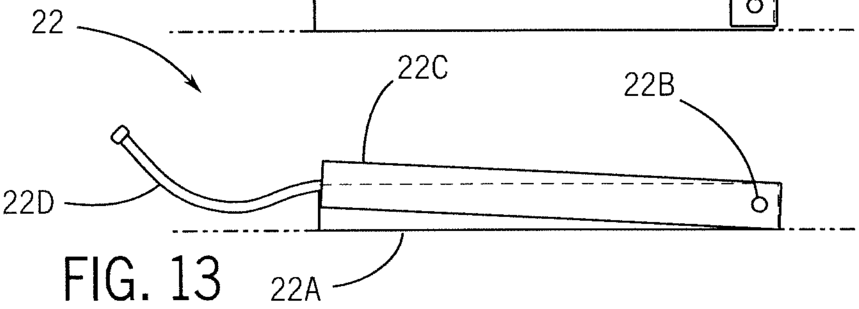
FIG. 13 shows a detail view of one embodiment of the handle bar of the present invention in a rest position.

By way of example, and referring to FIGS. 1-14, one embodiment of screen net assembly 10 configured to keep flying insects out of a garage. The screen net assembly 10 comprises a first magnetic garage screen net unit **10*a* for a single car stall garage. For a two-car stall garage there is a second magnetic garage screen net unit 10*b*. The garage 12 further comprises a garage door 14 with a pair of garage door rails 16**.

A first magnetic garage screen net unit **10*a* is arranged in the garage 12 and further comprises a screen 18. A first long door magnet 20 and a second long door magnet 20 are joined to the screen 18** with a seam therebetween.

A plurality of handle bars 22 are joined to the screen and configured to assist a user 32 with raising and lowering the first magnetic garage screen net unit **10*a* along the garage door 14. Each handle bar 22 further comprises a fixed arm 22A joined to a swing arm 22C at a pivot point 22B. A pull rope 22D arranged through the swing arm 22**C.

A plurality of locking bars 24 are joined to the screen 18 and configured to lock the screen 18 to an edge of the garage door 14. Each locking bar 24 further comprises a lock body 24A joined to a pair of locking arms 24B with a knob 24C.

In some embodiments, a first plurality of connecting magnets 26 is attached to the first magnetic garage screen net unit **10*a*. A second plurality of connecting magnets 26 is attached to the second magnetic garage screen net unit 10*b*. A second plurality of rail magnets 28 is attached to the first magnetic garage screen net unit 10*a*. The second plurality of connecting magnets 26 is attached to the second plurality of rail magnets 28 to connect the first magnetic garage screen net unit 10*a* to the second magnetic garage screen net unit 10*b***.

A walkway 30 is arranged between the first long door magnet 20 and the second long door magnet 20. A user 32 can walk through the walkway 30 while keeping flying insects out of the garage 12.

As used in this application, the term “a” or “an” means “at least one” or “one or more.”

As used in this application, the term “about” or “approximately” refers to a range of values within plus or minus 10% of the specified number.

As used in this application, the term “substantially” means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A screen net assembly, configured to keep flying insects out of a garage; the screen net assembly comprising:

a garage further comprising a garage door that travels along a first garage door rail and a second garage door rail;

a first magnetic garage screen net unit arranged in the garage and further comprising a screen having a lower edge on a ground surface;

a first long door magnet, and a second long door magnet, joined to the screen proximate and parallel to the lower edge and above the ground surface with a seam therebetween perpendicular to the lower edge;

a plurality of handle bars, joined to the screen parallel to the seam and perpendicular to the first long door magnet and the second long door magnet; and configured to assist a user with raising and lowering the first magnetic garage screen net unit along the garage door;

a plurality of locking bars, joined to the screen net and configured to be adjacent to an edge of the garage door, wherein each handle bar further comprises: a fixed arm joined to a swing arm at a pivot point; and a pull rope arranged through the swing arm;

a walkway, arranged between the first long door magnet and the second long door magnet with the seam;

wherein a user can walk through the walkway while keeping flying insects out of the garage.

2. The screen net assembly of claim 1, further comprising a second magnetic garage screen net unit, magnetically coupled to the first magnetic garage screen net unit and configured to cover a two-car garage.

3. The screen door assembly of claim 2, a first plurality of connecting magnets attached to the first magnetic garage screen net unit;

a second plurality of connecting magnets attached to the second magnetic garage screen net unit;

a first plurality of rail magnets, attached to the first magnetic garage screen net unit;

wherein the second plurality of connecting magnets is attached to the first plurality of rail magnets to connect the first magnetic garage screen net unit to the second magnetic garage screen net unit.

4. The screen net assembly of claim 3, wherein each locking bar further comprises a lock body joined to a pair of locking arms with a knob.

* * * * *